US011840966B1

(12) United States Patent
Adams et al.

(10) Patent No.: US 11,840,966 B1
(45) Date of Patent: Dec. 12, 2023

(54) TUNING ENGINE PARAMETER ESTIMATOR USING GAS PATH ANALYSIS DATA

(71) Applicant: RTX Corporation, Farmington, CT (US)

(72) Inventors: Joshua Adams, New Hartford, CT (US); Danbing Seto, Avon, CT (US); Ramesh Rajagopalan, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/990,487

(22) Filed: Nov. 18, 2022

(51) Int. Cl.
*F02C 9/00* (2006.01)

(52) U.S. Cl.
CPC ............ *F02C 9/00* (2013.01); *F05D 2270/11* (2013.01); *F05D 2270/20* (2013.01); *F05D 2270/44* (2013.01); *F05D 2270/71* (2013.01)

(58) Field of Classification Search
CPC .......... F02C 9/00; F02C 9/28; F05D 2270/11; F05D 2270/20; F05D 2270/44; F05D 2270/71
See application file for complete search history.

(56) References Cited

U.S. PATENT DOCUMENTS

| 8,386,121 | B1 | 2/2013 | Simon et al. | |
|---|---|---|---|---|
| 10,024,187 | B2 | 7/2018 | Soares, Jr. et al. | |
| 11,300,069 | B2 | 4/2022 | Moeckly et al. | |
| 2007/0073525 | A1* | 3/2007 | Healy | G05B 17/02 703/7 |
| 2008/0178600 | A1* | 7/2008 | Healy | F02C 9/00 60/773 |
| 2008/0243352 | A1* | 10/2008 | Healy | F02C 9/26 701/100 |
| 2009/0173078 | A1* | 7/2009 | Thatcher | F02C 9/20 60/773 |

FOREIGN PATENT DOCUMENTS

CN   112729857 B   10/2021

* cited by examiner

*Primary Examiner* — Jason H Duger
(74) *Attorney, Agent, or Firm* — CANTOR COLBURN LLP

(57) ABSTRACT

An engine parameter estimation tuning system includes an engine parameter estimator unit and a gas path analysis (GPA) unit. The engine parameter estimator unit includes an onboard model (OBM) configured to output estimated parameters based on operation of a gas turbine engine. The gas path analysis (GPA) unit includes a performance health monitor unit configured to adjust a long-term deterioration parameter independently from adjustment of a short-term tuning parameter to tune one or more targeted estimation parameters included in the estimated engine parameter. In this manner, the engine parameter estimation tuning system can realize the different time scales associated with uncertainties in an engine and accommodate them separately so that the estimated engine parameters become much more accurate.

13 Claims, 3 Drawing Sheets

TUNING ENGINE PARAMETER ESTIMATOR USING GAS PATH ANALYSIS DATA

BACKGROUND

Exemplary embodiments of the present disclosure pertain to the art of gas turbine engines, and more particularly to On-Board Model (OBM) engine parameter estimation tuning and health monitoring of gas turbine engines.

Gas path analysis is combination of physics-based and data-driven state-of-the-art engine health diagnostic method, which utilizes input-output information to perform engine performance monitoring and health assessments of gas turbine engines onboard or offboard. The gas path analysis involves generating trend data from measured data provided by various gas path sensors that monitor the operation of the engine in real-time and comparing the trend data against in-house models or onboard engine models to identify potential performance issues and detect engine core deterioration.

Parameter estimation and tuning is a real-time method for providing feedback information to the real-time control laws which govern the operation of an engine system. The parameter estimation and tuning involve an On-Board Model of a nominal engine system and adapting the nominal model to reflect each particular engine based on sensed information gathered in real-time from each engine on wing.

BRIEF DESCRIPTION

According to a non-limiting embodiment, an engine parameter estimation tuning system includes an engine parameter estimator unit and a gas path analysis (GPA) unit. The engine parameter estimator unit includes an onboard model (OBM) configured to output estimated parameters based on operation of a gas turbine engine. The gas path analysis (GPA) unit includes a performance health monitor unit configured to adjust a long-term deterioration parameter independently from adjustment of a short-term tuning parameter to tune one or more targeted estimation parameters included in the estimated engine parameter. In this manner, the engine parameter estimation tuning system can realize the different time scales associated with uncertainties in an engine and accommodate them separately so that the estimated engine parameters become much more accurate.

Additionally or alternatively, in this or other embodiments, the engine parameter estimator unit includes an OBM self-tuning module configured to receive measured engine parameters ($P_{mas}$) output from a sensor monitoring the gas turbine engine and utilizes the measured engine parameters ($P_{mas}$) to generate the short-term tuning parameter ($\Delta\eta$).

Additionally or alternatively, in this or other embodiments, the engine parameter estimator unit calculates an OBM parameter differential value ($\Delta P2$) based on a difference between the measured engine parameters ($P_{mas}$) and calculated engine parameters ($P_{cal}$) generated according to the OBM.

Additionally or alternatively, in this or other embodiments, the engine parameter estimator unit tunes the OBM based on the adjusted long-term deterioration parameter $\Delta\eta_{LT}$ provided by the GPA unit and the short-term deterioration parameter $\Delta\eta$ provided by the self-tuning module.

Additionally or alternatively, in this or other embodiments, the GPA unit further comprises a GPA engine model configured to generate synthesized engine parameters ($P_{syn}$) based on the operation of the gas turbine engine, and a GPA self-tuning module configured to output a GPA parameter differential value ($\Delta P1$) based on the measured engine parameters ($P_{mas}$) and the synthesized engine parameters ($P_{syn}$). The GPA self-tuning module generates the tuning parameters indicative of engine deterioration based on the GPA parameter differential value ($\Delta P1$), which are fed to the performance health monitoring unit to generate the adjusted long-term deterioration parameter ($\Delta\eta_{LT}$).

Additionally or alternatively, in this or other embodiments, the engine parameter estimation tuning system further comprises a data storage unit (DSU) configured to store the adjusted long-term deterioration parameter $\Delta\eta_{LT}$ which are periodically updated.

Additionally or alternatively, in this or other embodiments, the engine parameter estimator unit can obtain the engine input values from the DSU and generate the OBM.

Additionally or alternatively, in this or other embodiments, the GPA self-tuning module and the OBM self-tuning modules are each implemented as a Kalman Filter.

According to another non-limiting embodiment, a method of tuning an onboard model (OBM) comprises outputting, from an onboard model (OBM), estimated parameters ($P_{est}$) based on operation of a gas turbine engine, and adjusting, by a performance health monitor unit included in a gas path analysis (GPA) unit, a long-term deterioration parameter ($\Delta\eta_{LT}$) independently from adjustment of a short-term tuning parameter ($\Delta\eta$). The method further comprises tuning one or more targeted estimated included in the estimated engine parameter $P_{est}$, based on the adjusted long-term deterioration parameter ($\Delta\eta_{LT}$).

Additionally or alternatively, in this or other embodiments, the engine parameter estimation tuning system further comprises outputting measured engine parameters from a sensor monitoring operation of the gas turbine engine, and generating, by a an OBM self-tuning module, the short-term tuning parameter $\Delta\eta$ based on the measured engine parameters.

Additionally or alternatively, in this or other embodiments, the engine parameter estimation tuning system further comprises calculating, by the engine parameter estimator unit calculates, an OBM parameter differential value ($\Delta P2$) based on a difference between the measured engine parameters ($P_{mas}$) and calculated engine parameters ($P_{cal}$) generated according to the OBM.

Additionally or alternatively, in this or other embodiments, the engine parameter estimation tuning system further comprises tuning, by the engine parameter estimator unit, the OBM based on the adjusted long-term deterioration parameter ($\Delta\eta_{LT}$) provided by the GPA and the short-term tuning parameter ($\Delta\eta$) provided by the self-tuning module.

Additionally or alternatively, in this or other embodiments, the engine parameter estimation tuning system further comprises generating, by a GPA engine model included in the GPA unit, synthesized engine parameters ($P_{syn}$) based on the operation of the gas turbine engine; outputting, by a GPA self-tuning module a GPA parameter differential value ($\Delta P1$) based on the measured engine parameters ($P_{mas}$) and the synthesized engine parameters ($P_{syn}$); and generating, by the GPA self-tuning module, the adjusted long-term deterioration parameter $\Delta\eta_{LT}$ based on the GPA parameter differential value ($\Delta P1$).

Additionally or alternatively, in this or other embodiments, the engine parameter estimation tuning system further comprises storing the adjusted long-term deterioration parameter ($\Delta\eta_{LT}$) in a data storage unit (DSU); and periodically updating the stored adjusted long-term deterioration parameter ($\Delta\eta_{LT}$) so that the OBM is tuned with the updated adjusted long-term deterioration parameter ($\Delta\eta_{LT}$).

Additionally or alternatively, in this or other embodiments, the GPA self-tuning module and the OBM self-tuning modules are each implemented as a Kalman Filter.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
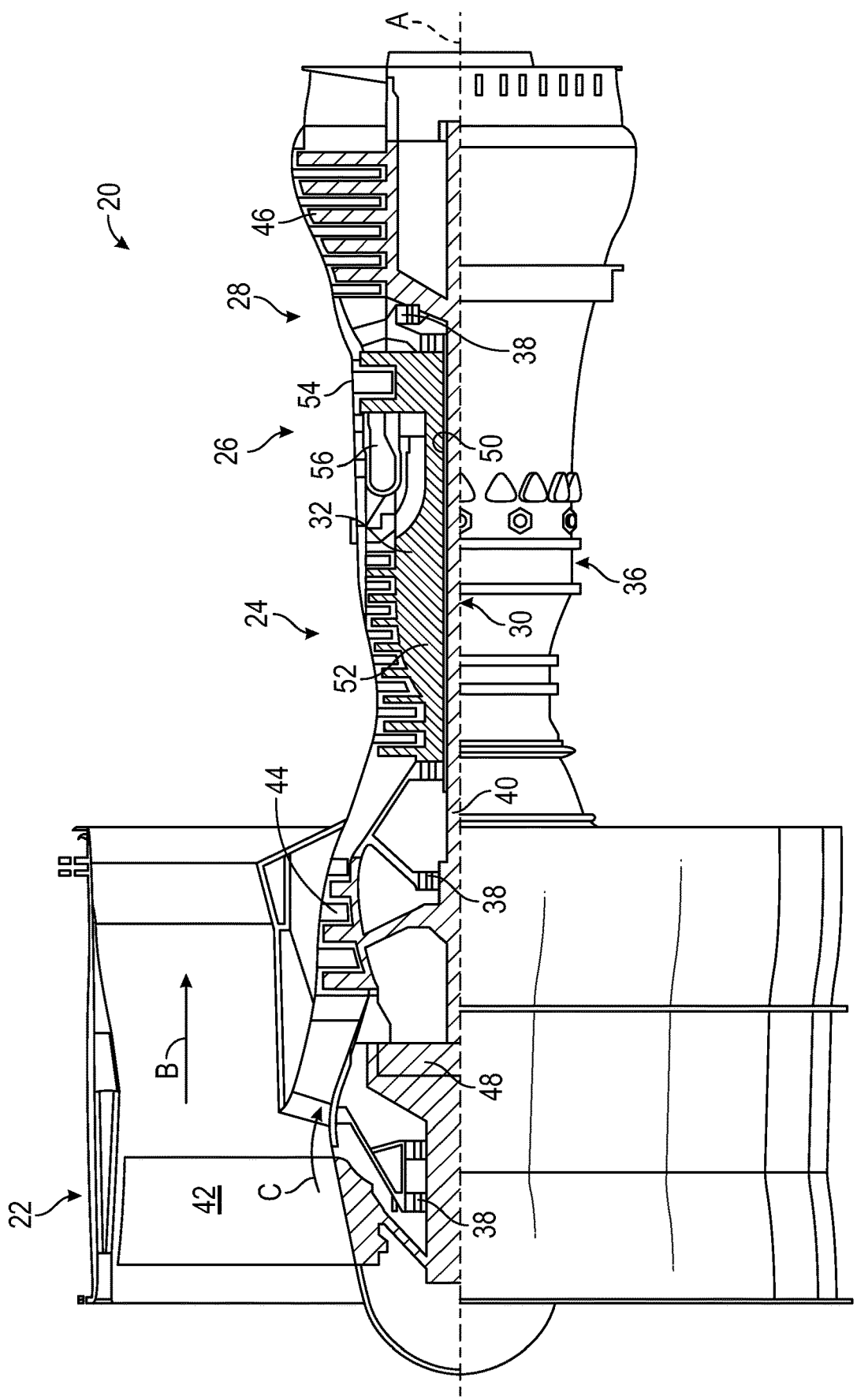
FIG. 1 is a partial cross-sectional view of a gas turbine engine.

A detailed description of one or more embodiments of the disclosed apparatus and method are presented herein by way of exemplification and not limitation with reference to the Figures.

The accuracy of the estimated engine parameters relies on how close the on-board model (OBM) tracking the engine under control. To close the gap between the OBM and the engine, the OBM is tuned with the residuals, namely, the difference of the real-time measured engine parameters provided by the gas path sensors and their calculated values by the OBM. However, the ability to tune OBM for engine parameter estimation is currently limited by the number of gas path sensors in the engine system. Typically, there are many more sources of variation and uncertainty than gas path sensors in the engine system. For this reason, multiple sources of variation and uncertainty are lumped together thereby limiting the capability to tune the OBMs.

In addition, the time scale at which different sources of uncertainty evolve can be very different. For instance, hysteresis effects in an actuator can manifest on the time scale of seconds or less. Flow capacity changes in a compressor, on the other hand, typically happen on the time scale of weeks or months or longer. When there are confounding effects at different time scales, it is difficult to design tuning schemes to improve the accuracy of estimated parameters.

For example, an engine system may be implemented with an OBM containing two sources of uncertainty and one input of gas path temperature sensor measurement (T3) to provide one output of interest (T41). Because the system has only one sensor, only one tuner is allowed, and a designer is left to choose between tuning a fast source of uncertainty or a slow source of uncertainty. With either choice the output will be more accurately estimated than without tuning, but it will not be optimal.

According to one or more non-limiting embodiments described herein, an engine parameter estimation tuning system is provided, which works in connection with a performance health monitor unit that operates an adaptive high-fidelity engine model and facilitates a gas path analysis (GPA) of the gas turbine engine. The performance health monitor unit utilizes the high-fidelity engine model together with GPA to track engine health features such as long-term deterioration of engine components and provide them for engine parameter estimation in an OBM that generates various estimated engine parameters. Accordingly, the OBM can take into account engine health changes in its baseline model, which allows a designer to optimize tuning of the OBM against non-health related uncertainties such as engine-to-engine variation due to design tolerances and manufacturing variation.

As described herein, the performance health monitor unit allows for considering the time scale separation that is inherent in different sources of uncertainty. In this manner, the engine parameter estimation tuning system can utilize data measurements over the time scale of a source of uncertainty to tune an OBM on the time scale of seconds. The performance health monitor unit also allows the engine parameter estimation tuning system to use partial or full flight data of the same parameters to tune long time scale parameters and provide more accurate estimates of engine parameters. The improved engine parameter estimation accuracy increases the accuracy of various performance metrics such as thrust, lower fuel burn, increased component life, etc.

With reference now to FIG. 1 a gas turbine engine 20 is schematically illustrate according to a non-limiting embodiment. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flowpath B in a bypass duct, while the compressor section 24 drives air along a core flowpath C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition-typically cruise at about 0.8 Mach and about 35,000 feet (10,688 meters). The flight condition of 0.8 Mach and 35,000 ft (10,688 meters), with the engine at its best fuel consumption, also known as "bucket cruise Thrust Specific Fuel Consumption ('TSFC')", is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
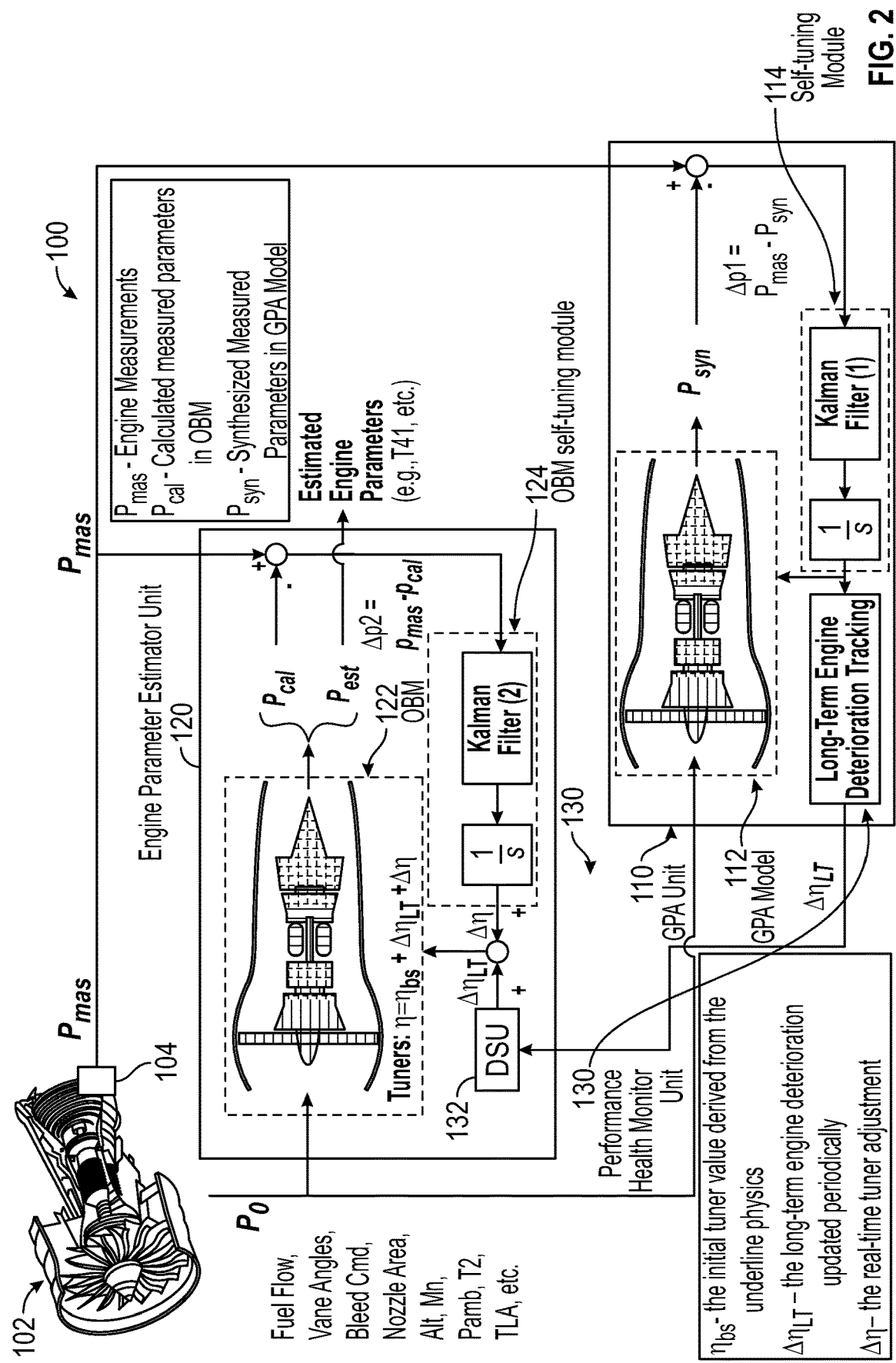
FIG. 2 is a diagram depicting an engine parameter estimation tuning system according to a non-limiting embodiment.

Referring now to FIG. 2, an engine parameter estimation tuning system 100 is illustrated according to a non-limiting embodiment. The engine parameter estimation tuning system 100 includes a gas turbine engine 102, one or more sensors 104, a gas path analysis (GPA) unit 110, and an engine parameter estimator unit 120. As described herein, a "module" or a "unit" (e.g., the gas path analysis unit 110 and the engine parameter estimator unit 120) can be constructed as an electronic hardware controller that includes memory and a processor configured to execute algorithms, models (e.g. a GPA model), and computer-readable program instructions stored in the memory. In addition, a combination of modules or units described can be embedded or integrated in a single controller.

The gas turbine engine 102 is configured to operate according to one or more engine control and environmental parameters ($P_O$). The engine control and environmental parameters ($P_O$) can include various calculated, and/or measured engine operating parameters. These parameters include, but are not limited to, fuel flow, vane angles, engine speed, bleed air flow rate, nozzle area, altitude, ambient air pressure, ambient temperature, and throttle lever angle (TLA). The same control and environmental parameters ($P_O$) are used as the inputs to the OBM 122 and the high-fidelity GPA model 112.

The sensors 104 are configured to monitor operation of the gas turbine engine 102 in real-time. Based on the operation of engine 102, the sensors 104 output in real-time a set of measured engine parameter signals indicating one or more measured engine parameter values ($P_{mas}$) of the one or more of the engine parameters. According to a non-limiting embodiment, one or more of the sensors 104 can be implemented as gas path sensors, which output various engine parameters utilized to perform engine parameter estimation tuning and a gas path analysis (GPA).

The gas path analysis unit 110 is in signal communication with the sensors 104. The gas path analysis unit 110 is configured to track engine health features and determine a long-term deterioration parameter ($\Delta\eta_{LT}$) indicative of long-term deterioration of the gas turbine engine based on the engine health features. Fan, Compressor, and turbine efficiency and flow capacities are examples of these health parameters The gas path analysis (GPA) unit 110 includes a GPA model 112, a GPA self-tuning unit 114, and a long-term engine deterioration tracking unit 130. The GPA model 112 can be defined as an adaptive high-fidelity model of the gas turbine engine 102 and is configured to generate one or more synthesized engine parameters ($P_{syn}$). The GPA self-tuning module is configured to produce the tuning parameters which are indicative of engine long-term deterioration and fed to the long-term engine deterioration tracking unit 130. A tuning parameter is a scalar value indicating component efficiency, flow capacity, remaining life of components, etc., and is estimated in real-time onboard if the GPA unit 110 is implemented onboard or offboard based on past and current flight data after landing of the gas turbine engine. The synthesized engine parameters ($P_{syn}$) present the engine parameters associated with operation of the gas turbine engine 102. A synthesized engine parameters ($P_{syn}$) refers to a parameter that is generated, obtained and/or calculated using a model rather than being directly measured and output from the sensors 104. The synthesized engine parameters ($P_{syn}$) in GPA unit 110 are the same parameters measured from the operation of the gas turbine engine 102, but their values are calculated by the GPA model.

According to one or more non-limiting embodiments, the GPA model 112 includes a detailed aero-thermal engine model, a data generated regression model, or a combination thereof. The GPA model 112 is defined by various engine parameters including, but not limited to, fuel flow, vane angles, engine speed, bleed air flow rate, nozzle area, altitude, ambient air pressure, ambient temperature, and throttle lever angle (TLA). The engine parameters used to generate the GPA model 112 can be obtained by measuring the performance of the gas turbine engine and the measured performance values.

The GPA self-tuning unit 114 receives a first engine parameter differential value ($\Delta P1$), which is indicative of a difference between the one or more measured engine parameter values ($P_{mas}$) and the one or more synthesized engine parameters ($P_{syn}$). According to a non-limiting embodiment, the GPA self-tuning unit 114 may employ a Kalman filter or some form of tuner, which continuously updates the measured engine parameter values ($P_{mas}$). Accordingly, the GPA self-tuning unit 114 can actively tune the GPA model 112 based on the engine parameter differential value (ΔP1).

The performance health monitoring unit 130 is configured to receive the tuning parameters from GPA self-tuning module 114, process the tuning parameters, and output a long-term deterioration value of ($\Delta\eta_{LT}$) to the engine parameter estimator unit 120 to be stored in the DSU 132. It trends the tuning parameters to remove the fluctuations and compare the trended result with the predefined deterioration models stored in the computation module in the forms of the tuning parameters. The predefined deterioration models will be functions of engine operating time and possibly engine operating history, and they will be used to validate the trended deterioration to ensure a valid long-term deterioration ($\Delta\eta_{LT}$) is generated.

The engine parameter estimator unit 120 is in signal communication with the one or more sensors 104. The engine parameter estimator unit 120 is configured to output one or more estimated engine parameters ($P_{est}$), and to receive the sensor measurements from sensors 104 for tuning the OBM 122 to match the engine under control. The engine parameter estimator unit 120 includes an on-board model (OBM) 122, an OBM self-tuning unit 124, and a data storage unit (DSU) 132.

The OBM 122 is configured to generate the estimated engine parameters ($P_{est}$) and to generate one or more calculated engine parameters ($P_{cal}$) representing the engine parameters associated with operation of the gas turbine engine 102. $P_{cal}$, for example, includes parameters that are calculated for tuning, while $P_{est}$ are estimated engine parameters that are targeted for control and other purposes. The OBM 122 can be tuned to match $P_{cal}$ to $P_{mas}$, and doing so, the accuracy of the estimated engine parameters $P_{est}$ can be significantly improved.

The OBM 122 can be implemented as an aero-thermal model of the gas turbine engine 102, for example, and expresses a mathematical relationship between various engine input values (e.g., fuel flow, compressor vane position, inlet pressure, inlet temperature, and the long-term deterioration parameter ($\Delta\eta_{LT}$)) and various engine output values (e.g., gas path pressures, temperatures, and rotor speeds).

According to a non-limiting embodiment, the data storage unit (DSU) 132 is configured to store the input engine values, particularly, the long-term engine deterioration ($\Delta\eta_{LT}$). Accordingly, the engine parameter estimator unit 120 can obtain the engine input values from the DSU 132 and generate the OBM 122. In one or more non-limiting embodiments, the input engine values stored in the DSU 132 are periodically updated. In this manner, the engine parameter estimator unit 120 can generate an updated OBM 122 prior to the next flight of the aircraft.

The OBM self-tuning unit 124 is configured to receive a second engine parameter differential value (ΔP2) based on a difference between the one or more measured engine parameter values ($P_{mas}$) and the calculated engine parameters ($P_{cal}$). According to a non-limiting embodiment, the OBM self-tuning module 124 can employ a Kalman filter or other forms of filter which continuously updates the calculated engine parameter values ($P_{cal}$). Accordingly, the OBM self-tuning unit 124 can actively tune the OBM 122 (e.g., varies the parameters defining the OBM 122) based at least in part on the second engine parameter differential value (ΔP2) such that the calculated engine parameters ($P_{cal}$) match the measured engine parameter values ($P_{mas}$). In this manner, the OBM 122 can provide outputs with much improved accuracy.

The OBM 122 is tuned by adding adjustments to its overall tuners 11 which is a set of model parameters (e.g., the efficiency and flow capacity of a component in OBM 122) to be adjusted. During engine operation, the tuners are adjusted as: $\eta=\eta_{bs}+\Delta\eta_{LT}+\Delta\eta$; where $\eta_{bs}$ is the baseline value of the tuners for a brand-new engine, derived from the physics; $\Delta\eta_{LT}$ is the long-term deterioration of the engine 102 fetched from the DSU 132; and $\Delta\eta$ is the short-term adjustment from the OBM self-tuning module 124.

The $\Delta\eta_{LT}$ is updated periodically as a period of engine operating time has accumulated, while the ($\Delta\eta$) is changing continuously in real-time as the engine 102 is operating. In an alternative view, the engine parameter estimator unit 120 is a self-tuning engine model with the baseline tuner values updated periodically with the long-term deterioration, namely, the new baseline tuner value is the sum of the old baseline tuner value and long-term deterioration adjustment of ($\Delta\eta_{LT}$).

Figure 3:
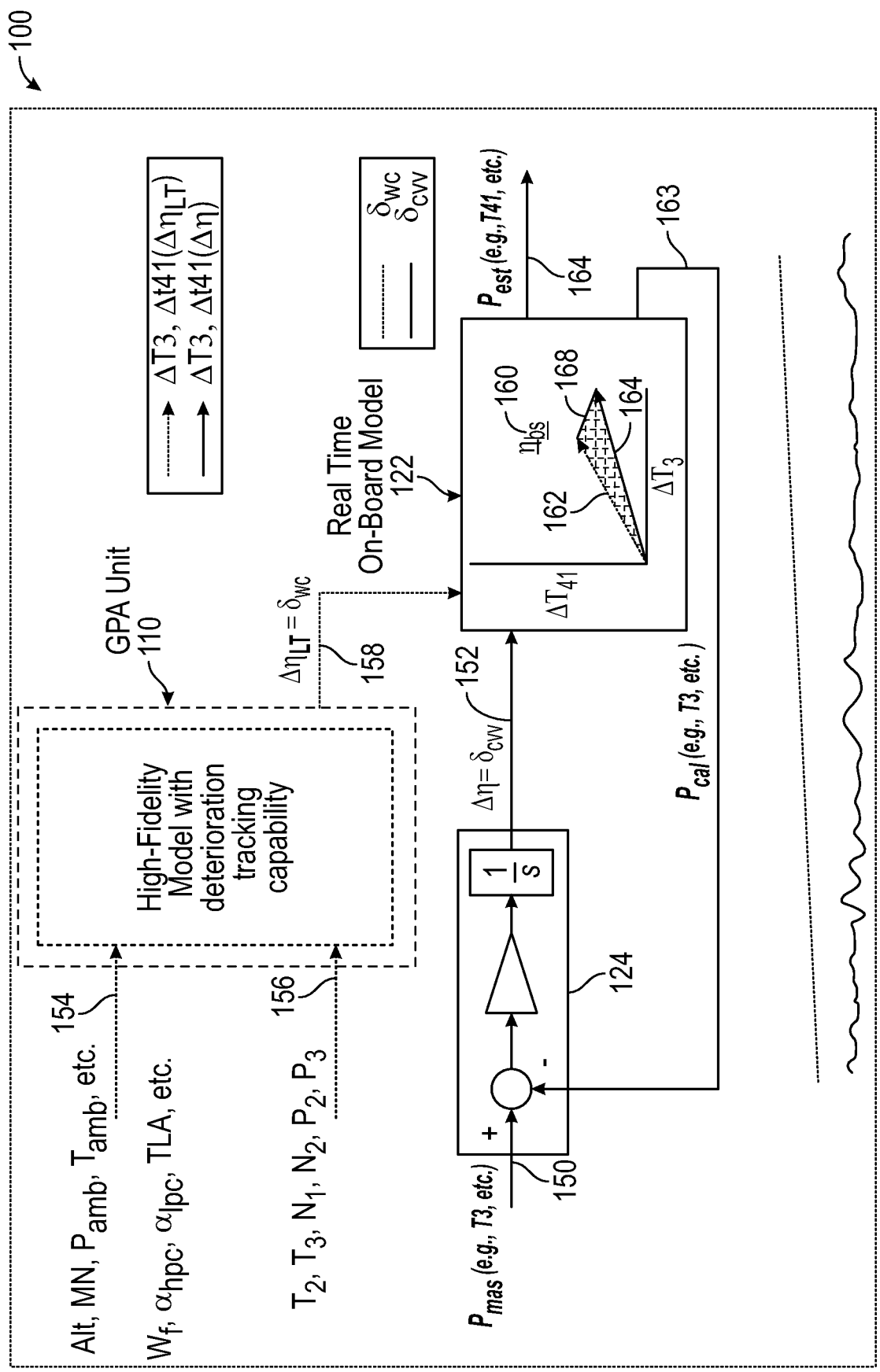
FIG. 3 is a diagram depicting an example of a performance health monitor unit included in an engine parameter estimation tuning system according to a non-limiting embodiment.

Turning to FIG. 3, a diagram depicts the capability of adjusting the ($\Delta\eta_{LT}$) and the ($\Delta\eta$) independently from one another to tune a targeted estimated engine parameter (e.g., T41) according to a non-limiting embodiment. A performance health monitor unit 130 included in an engine parameter estimation tuning system 100 includes of a high-fidelity model with deterioration tracking capability, which is in signal communication with the engine 102 to receive a first set of engine operational parameters 154 and a second set of engine operational parameters 156 to produce a long-term deterioration parameter ($\Delta\eta_{LT}$) 158. The first set of engine operational parameters 154 can include one or more engine operational parameters among the engine calculated/measured parameters (P0), while the second set of engine operational parameters 156 can also include one or more engine operational parameters among the measured engine parameters ($P_{mas}$).

The performance health monitor unit 130 effectively employs a second model that is used to correct a source (e.g., HPC flow capacity) contributing to long-term health performance uncertainty of the gas turbine engine. In this manner, the performance health monitor unit 130 included in the GPA unit 110 realize the long time scale of the uncertainty contributing to engine health performance (e.g., HPC flow capacity changes).

According to embodiments of the present disclosure, the OBM 122 can be tuned using an adjustment of the long-term deterioration parameter ($\Delta\eta_{LT}=\delta_{wc}$) 158 independently from an adjustment of the short-term tuning parameter ($\Delta\eta$) 152 (e.g., compressor efficiency $\delta_{cvv}$), and vice-versa, by adding them to the initial value of the baseline deterioration tuner parameter ($\eta_{bs}$) 160. In this manner, the long-term deterioration parameter ($\Delta\eta_{LT}$) 158 is effectively separated from the short-term tuning parameter ($\Delta\eta$) 152, which result in the long-term deterioration parameter $\Delta\eta_{LT}$ 158 and the short-term tuning parameter ($\Delta\eta$) 152 being adjusted independently from one another to precisely tune the $P_{est}$. An adjusted long-term deterioration parameter ($\Delta\eta_{LT}$) 158 will result in a change of the $P_{cal}$ (e.g., ΔT3) and a change in the $P_{est}$ (e.g., ΔT41) according to the functional plot-line (ΔT3, ΔT41($\Delta\eta_{LT}$)) 162, while an adjustment of the short-term tuning parameter ($\Delta\eta$) 152 will result in a change of the $P_{cal}$ (e.g., ΔT3) and a change in the $P_{est}$ (e.g., ΔT41) according to the functional plot-line (ΔT3,ΔT41($\Delta\eta$)) 164.

Conventional systems which exclude the performance health monitor unit 130 included in the GPA unit 110 described herein will be unable to tune the OBM 122 to obtained a tuned the $P_{est}$ (e.g., ΔT41) falling in a tuning range 168 between the functional plot-line (ΔT3,ΔT41

($\Delta\eta_{LT}$)) 162 and the functional plot-line ($\Delta T3,\Delta T41(\Delta\eta)$) 164 because adjusting the short-term tuning parameter ($\Delta\eta$) 152 will always change the long-term deterioration parameter ($\Delta\eta_{LT}$) 158, and vice versa, due to their dependency on one another (i.e., because they are bundled together). However, the performance health monitor unit 130 included in the GPA unit 110 described herein facilitates the adjustment of the long-term deterioration parameter ($\Delta\eta_{LT}$) 158 independently from the adjustment of the short-term tuning parameter ($\Delta\eta$) 152, and vice versa, thereby adjusting the functional plot-line ($\Delta T3,\Delta T41(\Delta\eta_{LT})$) 162 and/or the functional plot-line ($\Delta T3,\Delta T41(\Delta\eta)$) 164 to produce a tuned targeted estimated engine parameter $P_{est}$ (e.g., T41) located in the tuning range 168 between the functional plot-line ($\Delta T3,\Delta T41(\Delta\eta_{LT})$) 162 and the functional plot-line ($\Delta T3, \Delta T41(\Delta\eta)$) 164.

As described herein, adjustment of the short-term tuning parameter ($\Delta\eta$) 152 is produced using the model self-tuning unit 124 along with the residual of the input $P_{mas}$ (e.g., T3). In this example, the residual of the input $P_{mas}$ is the differential value between the measured T3 associated with the $P_{mas}$ 150 and the model calculated T3 associated with $P_{cal}$ 163. Accordingly, with the separated long-term deterioration ($\Delta\eta_{LT}$) identified in the performance health monitor included in the GPA unit 110, an engine designer is now able to focus its design on compensating for the short time scale HPCVV error with $\delta_{cvv}$. As a result, a more accurate estimate of the targeted estimated engine parameter(s) ($P_{est}$) (e.g., T41) can be generated.

In summary, various non-limiting embodiments of the present disclosure provide an engine parameter estimation tuning system, which includes a performance health monitor unit 130 that allows for consideration of the time scale separation that is inherent in different sources of uncertainty. For example, the performance health monitor unit facilitates adjustment of a long-term deterioration parameter $\Delta\eta_{LT}$ independently from the short-term adjustment $\Delta\eta$, and vice versa, to meet and achieve a more precisely tuned targeted estimated engine parameter $P_{est}$. In this manner, the engine parameter estimation tuning system can utilize data measurements over the time scale of a source of uncertainty to tune an OBM on the time scale of seconds.

The performance health monitor unit also allows the engine parameter estimation tuning system to use partial or full flight data of the same parameters to tune long time scale parameters and provide more accurate estimates of engine parameters. The improved engine parameter estimation accuracy increases the accuracy of various performance metrics such as thrust, lower fuel burn, increased component life, etc.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure is not limited to the particular embodiment disclosed as the best mode contemplated for carrying out this present disclosure, but that the present disclosure will include all embodiments falling within the scope of the claims.

What is claimed is:

1. An engine parameter estimation tuning system comprising:
    an engine parameter estimator unit including an onboard model configured to output estimated parameters based on operation of a gas turbine engine;
    a gas path analysis unit configured to produce a long-term deterioration parameter; and
    a performance health monitor unit included in the gas path analysis unit, the gas path analysis unit configured to adjust the long-term deterioration parameter independently from adjustment of a short-term tuning parameter to generate an adjusted long-term deterioration parameter, and configured to tune one or more targeted estimation parameters included in the estimated parameters based on the adjusted long-term deterioration parameter,
    wherein the engine parameter estimator unit includes an onboard model self-tuning module configured to receive measured engine parameters output from a sensor monitoring the gas turbine engine and utilizes the measured engine parameters to generate the short-term tuning parameter.

2. The engine parameter estimation tuning system of claim 1, wherein the engine parameter estimator unit calculates an onboard model parameter differential value based on a difference between the measured engine parameters and calculated engine parameters generated according to the onboard model.

3. The engine parameter estimation tuning system of claim 1, wherein the engine parameter estimator unit tunes the onboard model based on the adjusted long-term deterioration parameter provided by the gas path analysis unit and the short-term tuning parameter provided by the onboard model self-tuning module.

4. The engine parameter estimation tuning system of claim 2, wherein the gas path analysis unit further includes:
    a gas path analysis engine model configured to generate synthesized engine parameters based on the operation of the gas turbine engine; and
    a gas path analysis self-tuning module configured to output a gas path analysis parameter differential value based on the measured engine parameters and the synthesized engine parameters,
    wherein the gas path analysis self-tuning module generates tuning parameters indicative of engine deterioration based on the gas path analysis parameter differential value, which are fed to the performance health monitor unit to generate the adjusted long-term deterioration parameter.

5. The engine parameter estimation tuning system of claim 4, further comprising a data storage unit configured to store the adjusted long-term deterioration parameter which is periodically updated.

6. The engine parameter estimation tuning system of claim 5, wherein the engine parameter estimator unit is configured to obtain engine input values from the data storage unit and generate the onboard model.

7. The engine parameter estimation tuning system of claim 4, wherein the gas path analysis self-tuning module and the onboard model self-tuning module are each implemented as a Kalman Filter.

8. A method of tuning an onboard model, the method comprising:
    outputting, from an engine parameter estimator unit, estimated parameters obtained from the onboard model based on operation of a gas turbine engine;
    adjusting, by a performance health monitor unit included in a gas path analysis unit, a long-term deterioration parameter independently from adjustment of a short-term tuning parameter to generate an adjusted long-term deterioration parameter;
    tuning one or more targeted estimation parameters included in the estimated parameters based on the adjusted long-term deterioration parameter;
    outputting measured engine parameters from a sensor monitoring operation of the gas turbine engine; and
    generating, by an onboard model self-tuning module of the engine parameter estimator unit, the short-term tuning parameter based on the measured engine parameters.

9. The method of claim 8, further comprising calculating, by the engine parameter estimator unit, an onboard model parameter differential value based on a difference between the measured engine parameters and calculated engine parameters generated according to the onboard model.

10. The method of claim 8, further comprising tuning, by the engine parameter estimator unit, the onboard model based on the adjusted long-term deterioration parameter provided by the gas path analysis unit and the short-term tuning parameter provided by the self-tuning module.

11. The method of claim 9, further comprising:
    generating, by a gas path analysis engine model included in the gas path analysis unit, synthesized engine parameters based on the operation of the gas turbine engine;
    outputting, by a gas path analysis self-tuning module a gas path analysis parameter differential value based on the measured engine parameters and the synthesized engine parameters; and
    generating, by the gas path analysis self-tuning module, the adjusted long-term deterioration parameter based on the gas path analysis parameter differential value.

12. The method of claim 11, further comprising storing the adjusted long-term deterioration parameter in a data storage unit; and periodically updating the stored adjusted long-term deterioration parameter so that the onboard model is tuned with the updated adjusted long-term deterioration parameter.

13. The method of claim 11, wherein the gas path analysis self-tuning module and the onboard model self-tuning module are each implemented as a Kalman Filter.

* * * * *